June 8, 1954  O. H. SCHUCK  2,680,836
APPARATUS FOR PHASE COMPARISON AND ADJUSTMENT
Filed Jan. 3, 1944

INVENTOR
OSCAR H. SCHUCK
BY
ATTORNEY

Patented June 8, 1954

2,680,836

UNITED STATES PATENT OFFICE 2,680,836

APPARATUS FOR PHASE COMPARISON AND ADJUSTMENT

Oscar Hugo Schuck, Belmont, Mass., assignor to the United States of America as represented by the Secretary of the Navy Application January 3, 1944, Serial No. 516,864

5 Claims. (Cl. 324—57)

This invention generally relates to the direct measurement of complex impedance, and in particular to a method and apparatus for measuring impedance in terms of magnitude and phase angle, or in terms of resistive and reactive components; and particularly relates to apparatus for determining the impedance of a high frequency circuit carrying load current.

The method is particularly useful for measuring the impedance of under water sound transducers while transmitting under full load conditions. Only a small amount of power is consumed by the measuring equipment, and the measuring procedure is straightforward and simple. The accuracy obtainable compares favorably with that of an impedance bridge.

There are many methods available for measuring a complex impedance; the most generally favored for accuracy involve some type of impedance bridge. The large majority of impedance bridges are built to handle small amounts of power; such methods are therefore generally unsuited for measuring the impedance of apparatus, such as an underwater sound transducer with full load power applied. A measurement at full load is often desirable because of the possible non-linearity variation of the constants with power.

It is an object of this invention to provide a method and apparatus for the measurement of a complex impedance.

Another object of this invention is to provide a method and apparatus for the measurement of a complex impedance in terms of magnitude and phase angle, or in terms of resistance and reactive components.

Another object of this invention is to provide a method and apparatus for the measurement of a complex impedance when said impedance is under full load conditions.

Another object of this invention is to provide a method and apparatus for the measurement of a complex impedance wherein only a small amount of power is consumed by the measuring apparatus.

Another object is the provision of an apparatus which will be economical to manufacture, reliable in operation and which possesses all of the qualities of ruggedness and dependability in service.

Other objects and features will become apparent upon a careful consideration of the following detailed description when taken together with the accompanying drawings, the figures of which are designed for the sole purpose of illustration and not as a definition of the limits of the invention, reference for the latter purpose being had to the appended claims.

When it was found to be necessary to measure the full load impedance of devices such as transducers, various ordinary laboratory procedures were considered and found incapable of accomplishing the task. The ordinary impedance bridges did not have the capacity to handle the full load of the transducer.

It is fundamental to obtain the magnitude of an impedance by dividing the voltage across the impedance by the current flowing therethrough. However, it often happens in high frequency apparatus that the magnitude of this value of impedance and its components obtained at full load fail to agree with the value as measured in an impedance bridge at no load. The discrepancy is due to the phenomona of non-linearity of the impedance. Where fine adjustments of the circuit are necessary the values of resistance and reactance as determined at no load are not representative of said values at full load, and where the no load values are used the adjustments often fail to accomplish their purpose.

It is obvious that the full load values of resistance and reactance can be determined from the magnitude of the full load impedance, if the phase angle between the voltage across and the current through the impedance is known.

Figure 1:
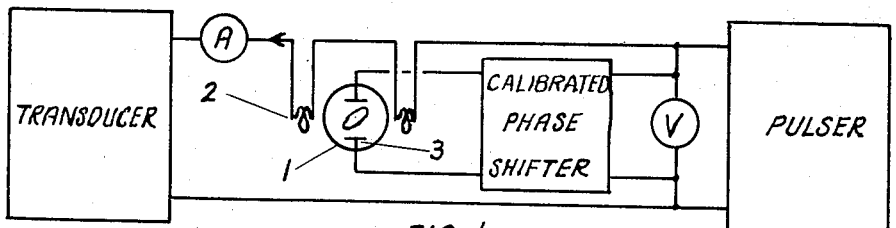
Figure 1 represents one form of my invention.

Applicant makes use of the fact that the phase angle can be accurately determined by the use of the cathode ray oscilloscope. Lissajou patterns are formed on the screen of a cathode ray oscilloscope when alternating potentials of different amplitude ratios, frequency ratios, and phase differences are applied to the deflecting plates. Conversely, when a particular pattern is noted on the screen; it is possible to tell the frequency, amplitude and phase relationship of the voltage and the current producing it. Figure 1 represents one form of the apparatus of this invention for measuring the full load impedance of a circuit. The circuit illustrated is that of an underwater sound transducer on the left to which full load power is supplied by the oscillator or pulser on the right through the measuring instruments shown in the center of the figure. The power from the oscillator is preferably applied in pulses, although a steady application may be made if heat conditions permit. Ammeter A measures the current passing through the transducer, and the voltmeter V measures the voltage across the transducer. The magnitude of the impedance can be found from the relation $$Z = \frac{V}{I}$$

Oscilloscope 1 has the full load current passing through the deflecting coils 2 and the voltage across the transducer is impressed on deflecting plates 3. The prior art teaches that where the power factor is unity the trace on the oscilloscope screen will be a straight line; and where the power factor is less than unity the trace will be an ellipse, the minor axis of which is a measure of a function of the power factor and/or phase angle. However, the accuracy obtainable is limited, particularly when dealing with angles approaching 90° due to large angle change for small axis change.

Applicant has found that by inserting an accurately calibrated phase shifter, the phase angle may be adjusted until the ellipse is collapsed to a straight line. The eye can accurately determine the presence of a straight line and the corresponding phase angle is read from the calibrated dial of the phase shifter. Once the phase angle between the current and voltage has been accurately determined, the magnitude of the impedance at full load can be broken down into its resistance and reactive components.

Figure 2:
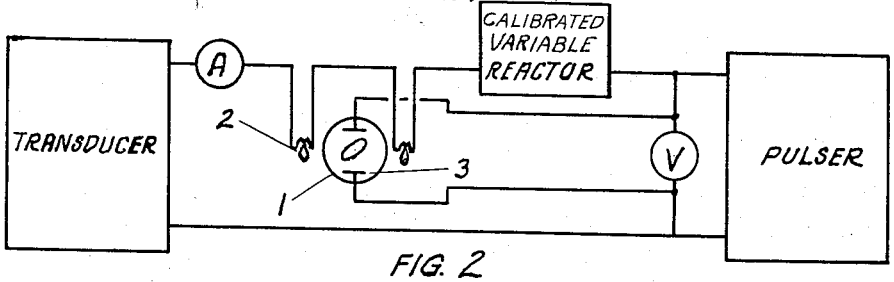
Figure 2 represents a modification of the form of this invention illustrated in Figure 1.

Figure 2 represents a modification of the invention of Figure 1. The general circuit connections are the same as that of Figure 1, except that the calibrated phase shifter is not used in the voltage circuit, instead an adjustable loss-free reactor is inserted in series with the load. The magnitude of the impedance is computed in the usual manner from the values of V and I when the reactor is set at zero reactance. The reactor is now adjusted to collapse the ellipse into a straight line, or in other words to make the power factor of the circuit unity. Under these conditions the full load resistance $$R = \frac{V}{I}$$

From the observed values of the full load impedance and resistance the full load reactance may be calculated in the usual manner. In this modification the required accuracy is obtained by adjusting the reactor until the ellipse is collapsed into a straight line. Obviously, if the load is capacitive in nature the reactor must be inductive and vice versa. If the reactor has an appreciable resistance the calculations must be corrected to allow for it. Knowing the reactance inserted in the circuit to reduce the phase angle to zero gives the reactance of the circuit or device under study, since the inserted reactance is equal to, but of opposite sign with respect to the reactance of the circuit or device.

Figure 3:
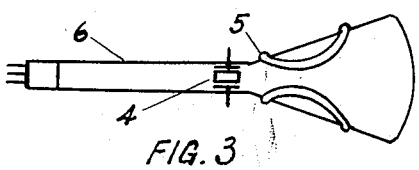
Figure 3 shows the current coil mounting on the cathode ray tube.

To practice this invention the cathode ray oscilloscope should be equipped with at least one pair of electrostatic deflection plates. A standard cathode ray tube containing two sets of deflecting plates may be used by applying magnetic deflecting coils externally. The number of turns in the deflecting coils depends on the current to be measured and should be adjusted to give readable deflections on the face of the CRO. For currents in the range of from one to three amperes, such as are taken by the usual underwater sound transducers at full load, for example, about twenty ampere turns are required for full scale deflection of a Dumont 3AP1-3″ oscilloscope. Two coils may be used, each of ten turns, wound on a diameter of approximately two and one-half inches, bent to fit saddle fashion on opposite sides of the tube 6, such as illustrated in Figure 3. The coils may be tapped to give a choice of current ranges.

In mounting the coils 5 they should be located so that their magnetic field does not cut the deflecting plates 4, because eddy currents induced in the plates produce a distortion of the field. When the coils are properly located they can be checked by noting if the indication is a straight line for a purely resistive load. In the above mentioned oscilloscope these conditions require the coils to be mounted on the slope of the bulb, causing an appreciable but relatively unimportant decrease in deflection sensitivity from that obtainable by mounting the coils on the neck of the tube 6.

In order to allow for the phase comparison of two currents, a second set of deflection coils may be fitted to produce a field at right angles to that produced by the first set. In this manner the phase of the currents in the separate halves of the transducer may be compared.

It is, of course, clear that the method of this invention is applicable not only to instances where it is desired to measure a phase angle, but applies as well to correction or adjustment of the phase angle of a circuit containing resistance and inductive or capacitive reactance. For example, if a circuit is to have a given phase angle, this can be provided by measuring the impedance of the circuit, inserting a phase shifter in the circuit and adjusting it to give the desired phase angle and then adjusting the original circuit reactance to give an indication of zero phase angle (a straight line) on the oscilloscope. When the phase shifter is removed, the adjusted elements of the original circuit will have the desired relation between the voltage and current therein.

A slight variation in the above procedure is to calculate the reactance and resistance required to give the desired phase angle and to insert the negative of this reactance into the circuit and adjust the original circuit elements to give zero phase angle indication on the oscilloscope. If the desired phase angle is such that the current is to lag the voltage the inserted reactance will be capacitative, and if the current is to be leading the inserted reactance must be inductive.

Figure 4:
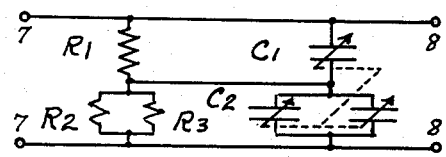
Figure 4 represents a phase shifting circuit for limited conditions.
Figure 5A:
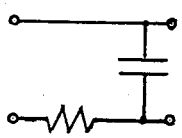
Figures 5a to 5d represent phase shifters that are possible but not particularly satisfactory for use.
Figure 5B:
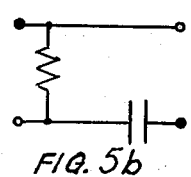
Figure 5C:
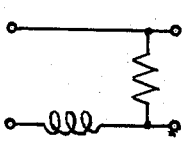
Figure 5D:
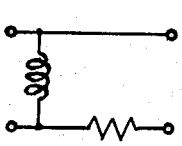

In some types of work where the range of phase shift is approximately −45° to +30°, and where the voltage available is sufficiently high so that only about a third can be applied to the cathode ray oscilloscope for full deflection, a stepless variable capacitor phase shifting circuit may be used in the calibrated phase shifter. This circuit is illustrated in Figure 4.

Capacitor $C_2$ consists of two identical straight line capacitance sections ganged together, and also ganged to capacitor $C_1$ which is identical to each of the two sections of capacitor $C_2$. However, there is this difference between them, $C_1$ is set at one hundred-eighty mechanical degrees from $C_2$; that is, $C_1$ is at a minimum capacitance when $C_2$ is at a maximum. The dial may be calibrated directly in degrees at a specified frequency, for example, 20,0000 cycles, and corrections may be made for the frequency actually used. Terminals 8 are connected to the oscilloscope.

The general requirements for the circuit of the calibrated phase shifter are (1) high input impedance as compared with the load impedance in order to avoid taking appreciable power, and (2) ease of reading and the reduction of observations to usable form. Circuits of the form illustrated in Figures 5a to 5d are possible but they do not readily permit of reduction to usable form. They introduce a variation in voltage deflection amplitude as the phase shift is varied.

Figure 6:
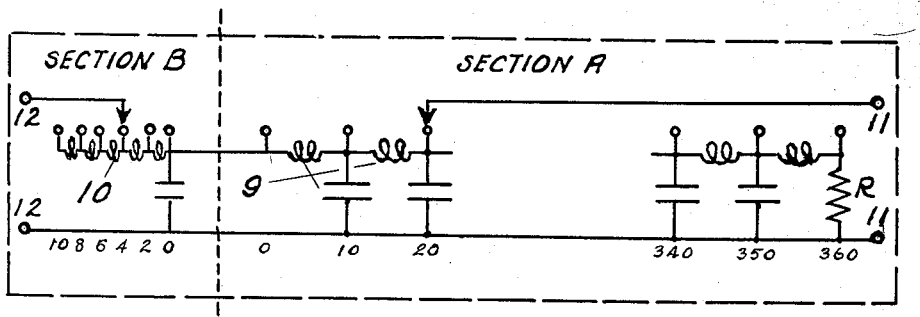
Figure 6 represents a preferred calibrated phase shifting circuit for use in this invention.

It has been found that the most convenient calibrated phase shifter for the purpose illustrated in Figure 1 is a lag-line or a lead-line terminated in its image impedance. This has the property of introducing phase shift without introducing appreciable amplitude variation. The lag line shifter is illustrated in Figure 6. It is shown as composed of two sections A and B.

Section A contains eighteen T sections 9 of constant K low pass filter, calculated to have a phase shift of twenty degrees per T section at 20,000 cycles. The section terminates in its image impedance R of 5000 ohms. Mid series and mid shunt taps are provided which give thirty-six steps of ten degrees each at 20,000 cycles; at any other frequency the phase shift is in terms of the phase shift at 20,000 cycles.

Section B is a half of one T section whose series inductor 10 is tapped to give five steps of two degrees each at 20,000 cycles. The combination of sections A and B allows a direct reading in steps of two degrees at 20,000 cycles. In other words, section B provides vernier degree measurements for each step of 10° of section A. For measurements made in a range of frequencies up to 30,000 cycles these two degree steps are close enough, particularly since interpolation will allow reading to better than one electrical degree at any frequency. For measurements in a frequency range of 50,000 cycles a second lag line shifter may be required.

In the construction of section A thirty-six universal wound coils on iron dust cores are made up and adjusted to have an inductance of 6.95 mh. with a Q of about seventy. The eighteen capacitors are selected having a value of 555 $\mu\mu$f. After the elements are connected, each section is compared for phase shift with one selected as a standard. No difference should be found. When the eighteen sections are connected together the phase shift should be found to be exactly 360° at 20,000 cycles.

To minimize the mutual coupling the coils in close proximity to each other are oriented for zero mutual inductance. The components are mounted on a rack with a thirty-seven point selector switch on the front of the panel.

In the construction of section B the five separate coils of 1.59 mh. each and the one capacitor of 257 $\mu\mu$f. are mounted on the rack. The panel contains a six point switch.

When the voltage to be applied to the deflecting plates is much greater than that required to produce full screen deflection a potentiometer across the load is used. The use of this potentiometer introduces no phase error if only section A of the shifter is used, but it can introduce a slight error if section B is also used. However, if section B is constructed to comprise five 2° T sections, and if the switch is arranged to eliminate the unused sections from the circuit, no error will be introduced. Even with section A alone an accuracy of better than one degree can be realized by using a graphical interpolation.

I claim:

1. A system for measuring the full load impedance of a circuit having a pair of conductors feeding a resistance and reactive load from a high frequency supply, comprising a first meter connected in series in said circuit and at a point responsive to current therein, a second meter connected across voltage points of said conductors and responsive to voltage thereacross, a phase-shifting means, a cathode ray oscilloscope having a pair of beam-deflecting means, means connecting a first of said beam-deflecting means to be responsive to current at the first said point, means connecting a second of said beam-deflecting means to be responsive to voltage across said voltage-points, and means connecting said phase-shifting means to said circuit, said phase-shifting means comprising reactance means variable to bring said current and voltage to which said cathode ray oscilloscope is responsive in phase.

2. A system for measuring the full load impedance of a circuit feeding a resistance and reactance load from a high frequency supply, comprising an ammeter and a current coil connected in series in said circuit, low-loss calibrated phase-shifting means having an input and an output, means connecting the input of said phase-shifting means across said circuit, said phase-shifting means comprising reactances variable to bring the current in and the voltage across said circuit in phase, a voltmeter connected across said circuit, and a cathode ray oscilloscope having a pair of beam deflecting means, one of said pair being connected to the output of said phase-shifting means, and the other of said pair being connected to said current coil.

3. A system as defined in claim 2 but further characterized by said reactances of said phase-shifting means comprising a network comprising a plurality of T-sections.

4. A system as defined in claim 2 but further characterized by said reactances of said phase-shifting means comprising a network comprising a plurality of T-sections formed of condensers as uprights and coils as cross-bars in combination with a half T-section formed of a condenser as an upright and a series of tapped coils as a half cross-bar.

5. A system as defined in claim 2 but further characterized by said reactances of said phase-shifting means comprising two identical parallel condensers connected in series with a third condenser equal in capacitances to each of the two identical condensers, a plurality of said condensers having adjustable capacitances.

References Cited in the file of this patent

UNITED STATES PATENTS

| Number | Name | Date |
| --- | --- | --- |
| 961,265 | Stone | June 14, 1910 |
| 984,108 | Roos | Feb. 14, 1911 |
| 1,768,262 | Marrison | June 24, 1930 |
| 2,012,480 | Reich | Aug. 27, 1935 |
| 2,193,079 | Schrader | Mar. 12, 1940 |
| 2,243,234 | Von Duhn | May 27, 1941 |
| 2,273,066 | Povey et al. | Feb. 17, 1942 |
| 2,285,038 | Loughlin | June 2, 1942 |
| 2,302,230 | Livingston | Nov. 17, 1942 |
| 2,313,699 | Roberts | Mar. 9, 1943 |
| 2,316,153 | Brown | Apr. 13, 1943 |
| 2,320,476 | Schrader et al. | June 1, 1943 |
| 2,328,985 | Luck | Sept. 7, 1943 |

OTHER REFERENCES

Electronics, May 1943, pages 86–88, 176 and 178.
"Standard Handbook for Electrical Engineers," Fifth Edition (1922), McGraw-Hill Co., sec 3–148, page 153.